United States Patent [19]
Jensen

[11] Patent Number: 5,338,137
[45] Date of Patent: Aug. 16, 1994

[54] ADJUSTABLE DECKING SYSTEM FOR USE IN SUPPORTING FREIGHT IN A COMPARTMENT

[76] Inventor: Richard H. Jensen, 2761 W. 225th St., Torrance, Calif. 90505

[21] Appl. No.: 843,177

[22] Filed: Feb. 28, 1992

[51] Int. Cl.⁵ .............................................. B61D 45/00
[52] U.S. Cl. .................... 410/146; 211/187; 410/150
[58] Field of Search ............... 410/132, 138, 139, 143, 410/144, 145, 146, 147, 148, 149, 150, 104, 105; 211/187, 208, 162, 94, 94.5

[56] References Cited

U.S. PATENT DOCUMENTS

| | | | |
|---|---|---|---|
| 2,891,490 | 6/1959 | Elsner | 410/105 |
| 3,066,620 | 12/1962 | Schroeder | 410/147 |
| 3,534,692 | 10/1970 | Verde | 410/146 |
| 3,782,295 | 1/1974 | Balinksi | 410/150 X |
| 4,079,677 | 3/1978 | Vandergriff et al. | 410/147 |
| 4,484,847 | 11/1984 | Holmes | 410/104 |
| 4,992,015 | 2/1991 | Florence | 410/104 |

Primary Examiner—Michael S. Huppert
Assistant Examiner—William M. Hienz

[57] ABSTRACT

A pair of tracks having spaced cutouts formed along the longitudinal extent thereof are mounted vertically on opposite walls of a compartment such as the interior of a truck or other transportation vehicle. A beam assembly is formed by a pair of channel members and a beam member in which the channel members are slidably supported in telescoping relationship, the channel members having limited longitudinal movement relative to the beam member. One end of each of the channel members protrudes from the beam member and has a spring actuated latching device attached thereto. The effective length of the assembly can be adjusted by slidably positioning the channel members relative to the beam member to bring the latching devices into contact with the opposing tracks with such latching devices being selectively fitted onto flanged portions of the track and into a pair of opposing track openings so that they latch onto the track. A pair of such beam assemblies can be utilized to support a shelf or to directly support cargo without the intermediary of such a shelf.

4 Claims, 4 Drawing Sheets

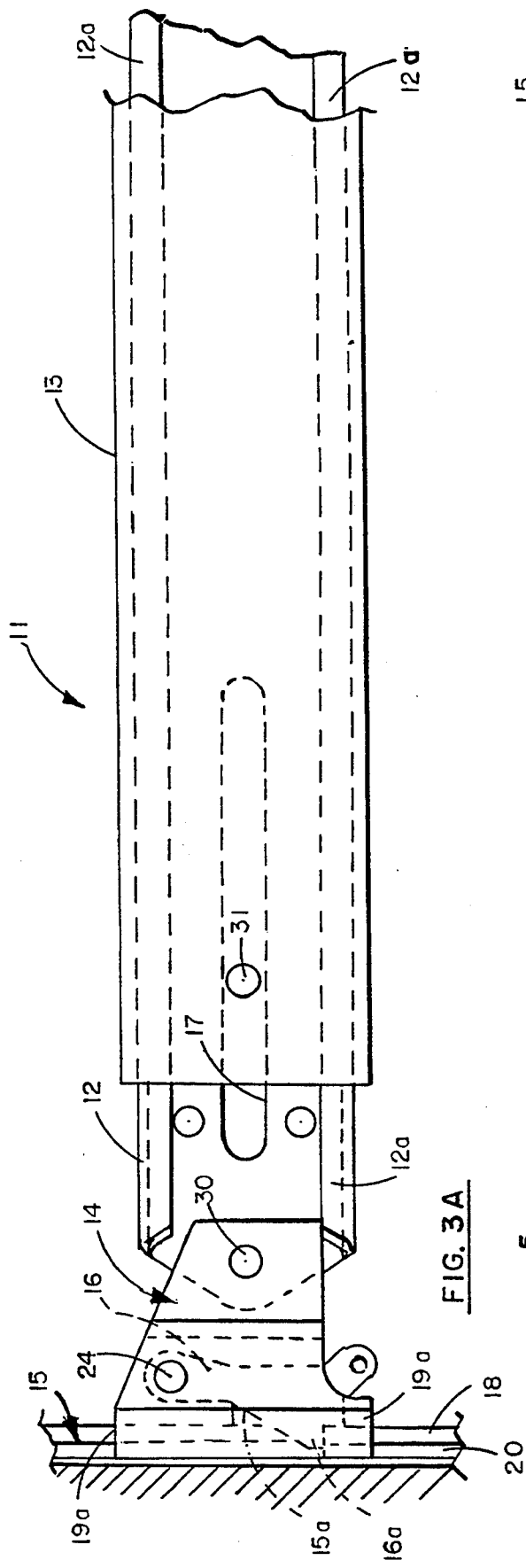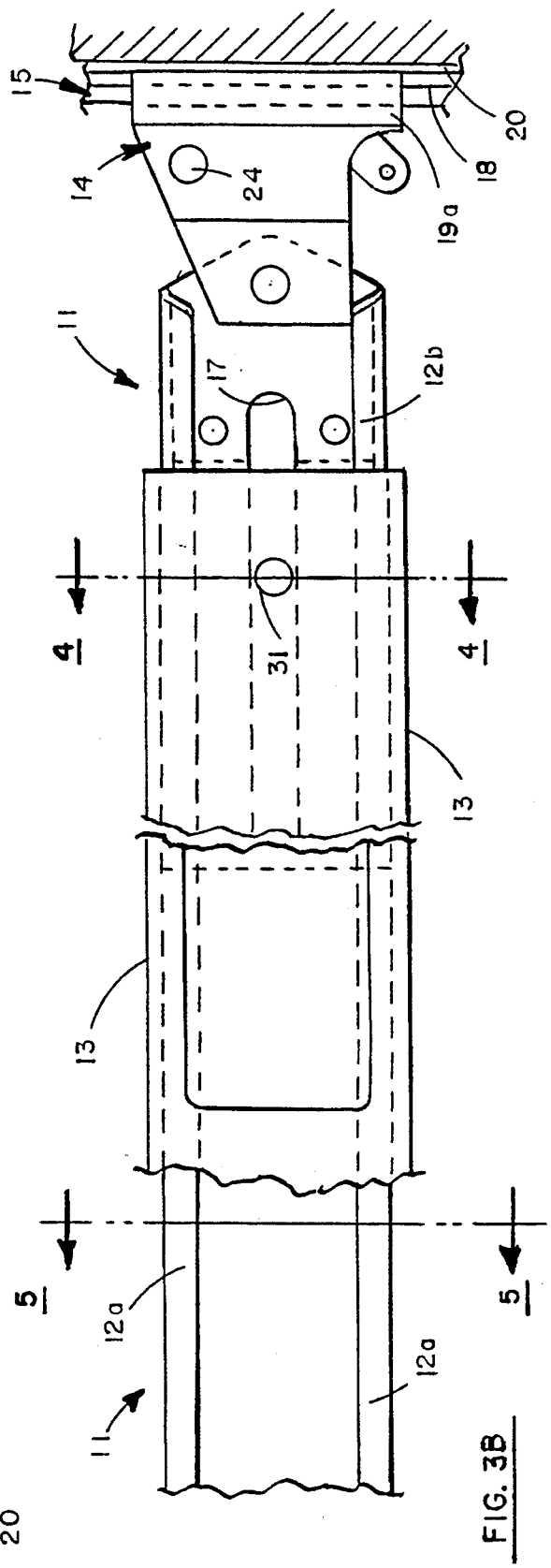

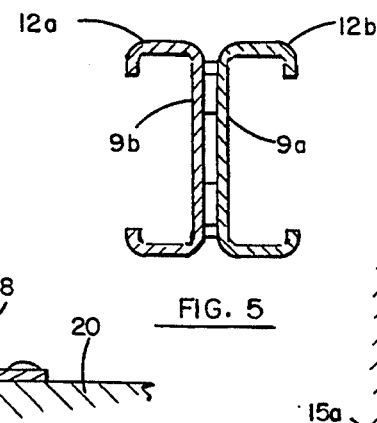
FIG. 5
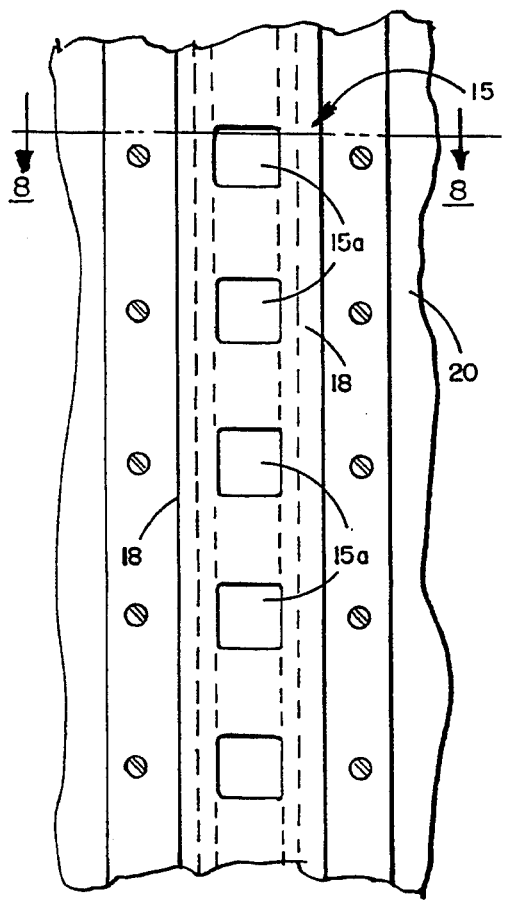
FIG. 8
FIG. 7
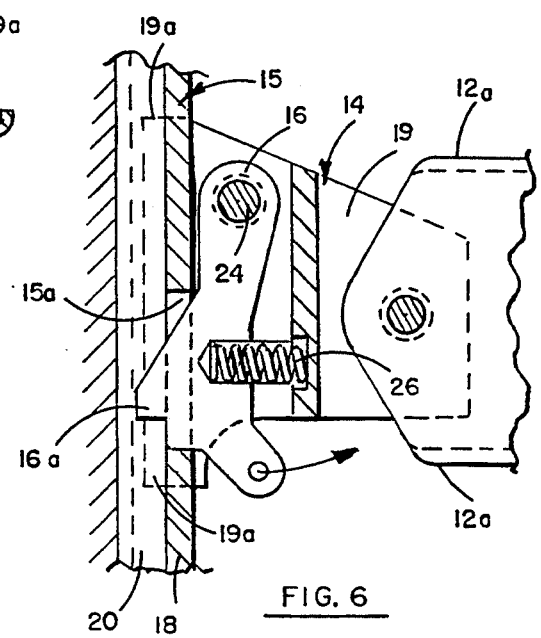
FIG. 6
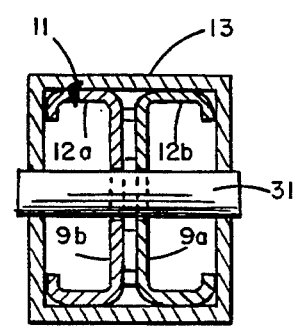
FIG. 4

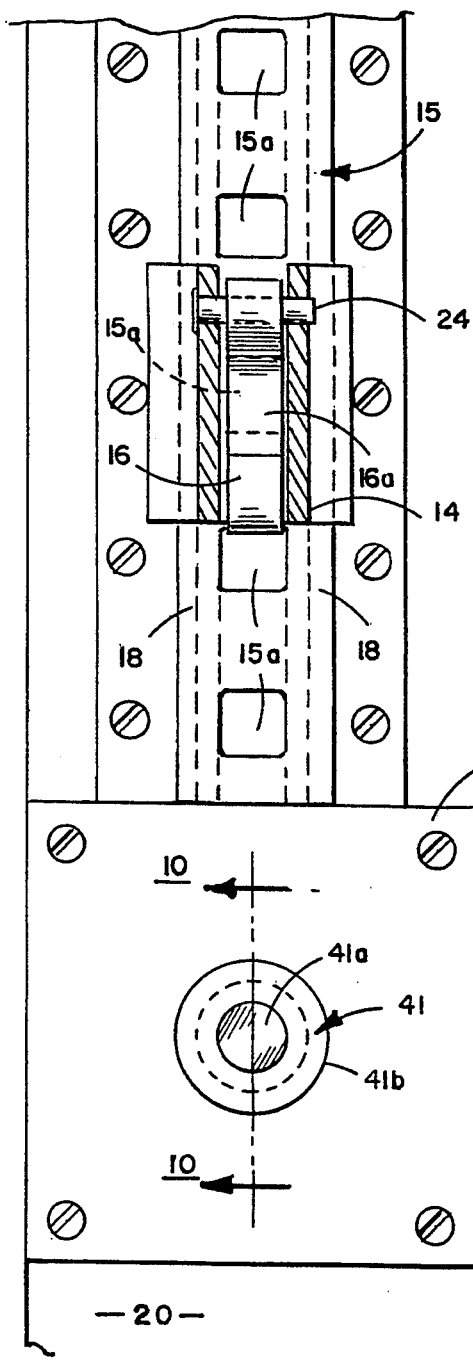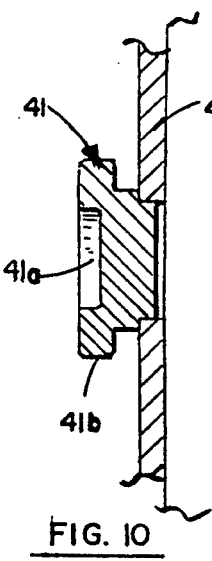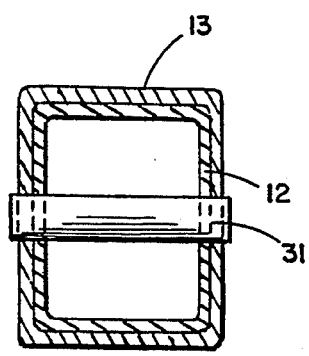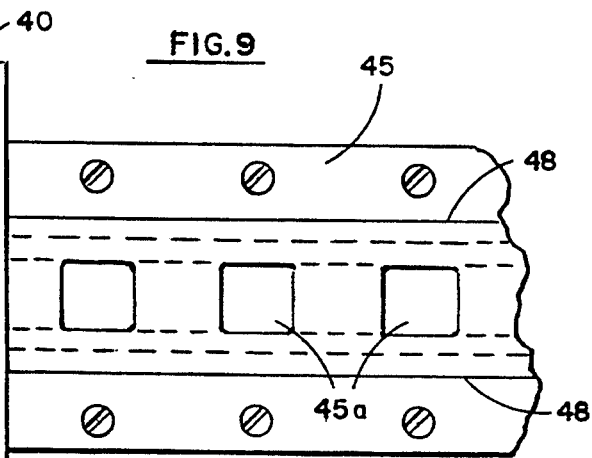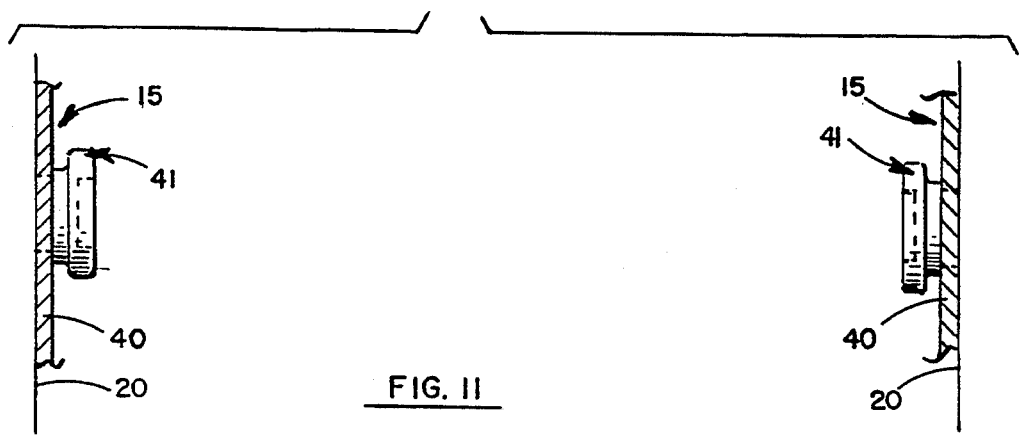

ADJUSTABLE DECKING SYSTEM FOR USE IN SUPPORTING FREIGHT IN A COMPARTMENT

BACKGROUND OF THE INVENTION

1. Field of the Invention

This invention relates to support beams for use in supporting freight in a compartment such as in a vehicle and more particularly so such a support beam assembly which can be selectively adjusted to a desired height.

2. Description of the Related Art

In vehicles employed for handling freight such as trucks, aircraft and railroad cars, it is often desirable to provide beams, decks or shelves to support various cargo items. In order to facilitate loading of such cargo and the handling of various types of shipments, it is necessary that such cargo support systems be versatile in their positioning and readily relocated from the cargo handling area to a stowage location if need be.

Various cargo support systems have been developed in the past. In U.S. Pat. No. 3,066,620 issued on Dec. 4, 1962 to R. C. Schroeder a cargo handling system is described which employs beams which are telescopically adjustable in length to facilitate their installation. This system further employs spring actuated latching members which latch into openings formed in rails installed on the walls of the vehicle compartment. In Schroeder, the rails are oriented horizontally. Further, there are no means provided on the beams other than the latches for engaging the rails so that they cannot easily be slided therealong from opening to opening and are not retained to such rails except by the latches.

BRIEF SUMMARY OF THE INVENTION

The system of the present invention is a simple and easily adjustable freight support device for a vehicle which can be adjusted to provide support beams or shelving at a great variety of different heights or which can be entirely removed from the cargo area. Such system employs pairs of tracks which are vertically mounted in opposing relationship along opposite walls of the vehicle freight compartment. Such tracks have T-shaped runners with a plurality of spaced openings formed therein along the longitudinal extent thereof. A beam assembly is employed which includes a pair of channel units which are telescopically fitted into opposite ends of a rectangular beam member with the ends of said channel units protruding from the opposite ends of the beam member. A spring actuated latching assembly is attached to the protruding ends of each of said channel units. Said latching assembly has a C-shaped end which matingly engages the flanges of the T-shaped runner which runs along the longitudinal extent of the track. The length of the beam assembly can be telescopically adjusted so that the ends of the latching assembly properly engage the track runner. The ends of the beam member can then be positioned at a desired height with the latching members of the latching assemblies fitted into selected track openings in engagement with the walls of such openings. A button assembly may be provided adjacent to the ends of the vertical tracks on which the beam assemblies can be easily rotated ninety degrees so that they can be positioned along a pair of opposing horizontal tracks oriented normal to the vertical tracks.

BRIEF DESCRIPTION OF THE DRAWINGS

FIG. 3A is a side elevational view of the left hand portion of a preferred embodiment of the invention;

FIG. 3B is a side elevational view of the right hand portion of a preferred embodiment of the invention;

FIG. 4 is a cross sectional view taken along the plane indicated by 4—4 in FIG. 3B;

FIG. 4A is a cross sectional view of an alternative form of the channel assembly of the invention;

FIG. 5 is a cross sectional view taken along the plane indicated by 5—5 in FIG. 3B;

FIG. 6 is a side elevational view partly in section illustrating the latching assembly of the preferred embodiment;

FIG. 7 is a front elevational view of the track of the preferred embodiment;

FIG. 8 is a cross sectional view taken along the plane indicated by 8—8 in FIG. 7;

FIG. 9 is a front elevational view illustrating a button assembly which may be used to enable the positioning of the beam assemblies along a horizontal track;

FIG. 10 is a cross sectional view taken along the plane indicated by 10—10 in FIG. 9; and FIG. 11 is an elevational view showing the button assembly in its operational environment.

DETAILED DESCRIPTION OF THE INVENTION

Figure 1:
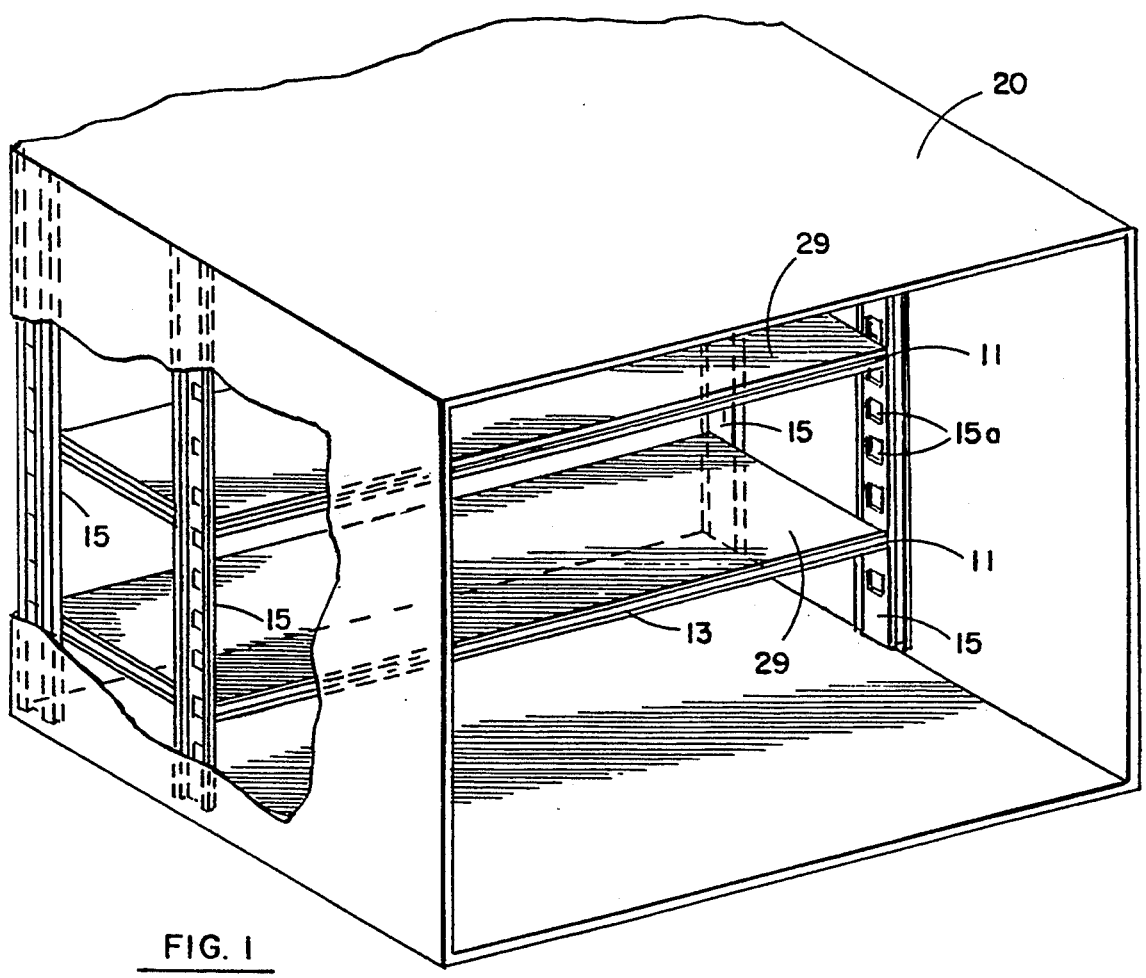
FIG. 1 is a perspective view illustrating a typical use of the system of the invention in supporting shelving in a vehicle compartment.

Referring now to FIG. 1, the device of the invention is illustrated in a typical application. Two pairs of tracks 15 are mounted on the side walls of compartment 20, the tracks of each pair being directly opposite each other. Compartment 20 may be the freight carrying compartment of a vehicle such as a truck. The tracks have a plurality of spaced openings 15a formed therein, these openings being arranged along the longitudinal extent of the tracks.

Supported between tracks 15 are beam assemblies 11. Such beam assemblies, as to be described in detail further on in the specification, can be adjusted to a desired height in engagement with a pair of opposing tracks 15 at a selected pair of track openings 15a. By setting a pair of such beams in the forward and rear tracks at the same height, a support for shelves 29 is provided. If so desired, the shelving can be dispensed with and the beam assemblies used to support cargo containers or the like.

Referring now to FIGS. 2–8, a preferred embodiment of the invention is illustrated. Beam assembly 11 comprises a first and second similar channel unit 12a and 12b. Each of these units is formed from a pair of channel members 9a and 9b having a C-shaped cross-section which are joined together in back to back relationship by suitable means such as rivetting. Channel units 12a and 12b may also be in the form of a rectangular tube, as shown in cross section in FIG. 4A. Each channel unit has a longitudinal slot 17 formed therethough.

Figure 2:
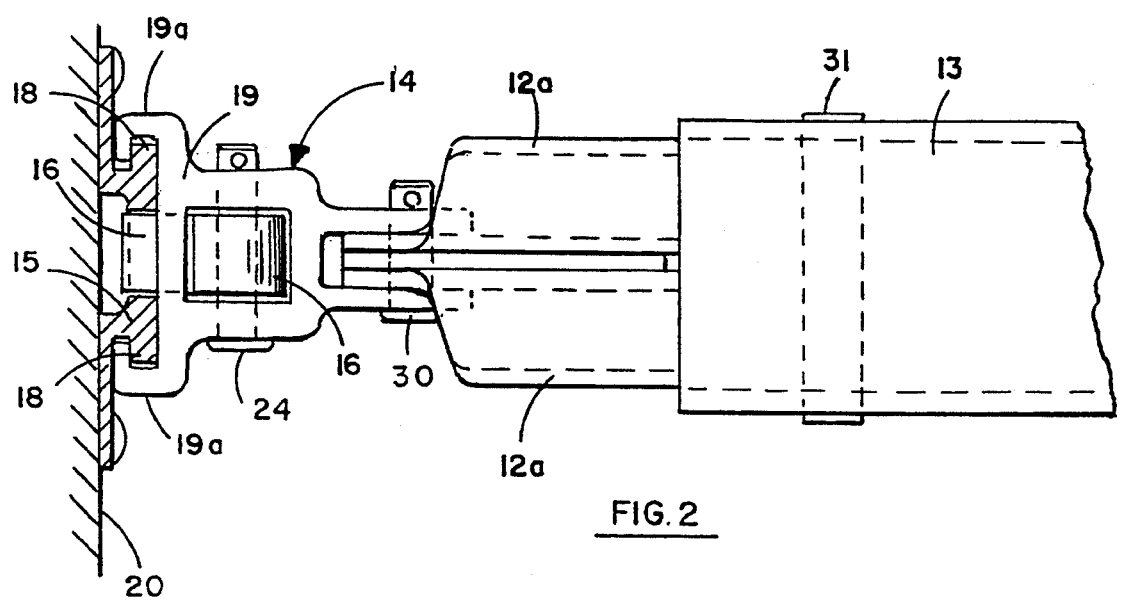
FIG. 2 is a top plan view of a preferred embodiment of the invention.

Attached to one end of each of the channel units by suitable means such as pins 30 is a latching assembly 14. As best can be seen in FIGS. 2 and 6, the latching assembly has a latching member 16 which is pivotally mounted on housing 19 by means of pin 24. Spring 26 which is mounted in housing 19 urges the latching arm 16a of the latch into opening 15a of track 15 in engagement with the track. Housing 19 has a C-shaped end portion 19a which matingly fits onto the T-shaped runner 18 of track 15 so that it is slidably retained thereon. To permit installation of end portions 19a onto runner 18, one or both ends of the track may be spaced slightly from the floor and/or ceiling of the compartment.

Channel units 12a and 12b are telescopically fitted within hollow beam member 13 which has a rectangular cross-section. Pin members 31 extend through beam member 13 and fit through slots 17 formed in each of the channel units. In this manner, the channel units are retained in the beam member for independent longitudinal adjustment relative thereto.

The effective length of the beam assembly thus can be adjusted on either end of such assembly by telescopically positioning the channel units. In this manner, first one and then the other of the latching members can be installed in the desired track aperture at the desired height. When not in use, the beam assemblies can be stowed by installing them at the top ends of the tracks.

Referring now to FIGS. 9-11, a button assembly which may be employed to transfer the beams from the vertical tracks to a horizontal track 45 for stowage or other utilization is shown in its operative environment. A plate 40 is attached to the wall of the vehicle at the end of each of the vertical tracks 15. Fixedly attached to each of the plates, as, for example, by welding is a button member 41. Button member has a circular indentation 41a formed in the central portion thereof and a circular lip 41b running around its periphery. The diameter of lip 41b is such as to mate with the C-shaped end portions 19a of latching assembly 14 and indentation 41a is adapted to receive latching arm 16a. Thus, the beam assemblies can readily be slided onto the button assemblies and rotated ninety degrees thereon and thence positioned as may desired along horizontal track 45. Horizontal track 45 is similar in configuration to vertical tracks 15, having apertures 45a corresponding to apertures 15a and runners 48 which correspond to runners 18.

The device of the invention thus provides a simple adjustable decking system which is particularly suitable for use in a vehicle and with which the height of support beams for cargo can readily be adjusted or such beams eliminated from the cargo area and moved into stowed positions.

While the invention has been described and illustrated in detail, it is to be clearly understood that this is intended by way of illustration and example only and is not to be taken by way of limitation, the scope of the invention being limited only by the terms of the following claims.

I claim:

1. An adjustable decking system for use in supporting freight in a compartment having opposing walls comprising:
   a pair of similar tracks vertically mounted on said opposing walls in directly opposing relationship to each other,
   said tracks having a plurality of spaced openings formed therein running along the longitudinal extent thereof,
   said tracks further having T-shaped runners extending therealong,
   a beam assembly formed by a pair of channel units and a beam member in which the channel units are telescopically supported for slidable longitudinal motion relative thereto,
   one of the ends of each of said channel units protruding from each of the opposite ends of said beam member respectively, and
   a latching assembly attached to each of the protruding ends of said channel units, said latching assemblies each including a spring actuated pivotally supported latching member and C-shaped members slidably engaging said T-shaped runners in mating relationship therewith,
   said beam assembly being selectively adjustable in height along said opposing tracks by slidably positioning the latching assemblies along said tracks to bring the latching members thereof into engagement with a selected pair of opposing track openings.

2. The system of claim 1 and further including a third track mounted in said compartment normally to said pair of tracks, and a pair of button assemblies mounted in directly opposing relationship to each other on each of said opposing compartment walls at one of the ends of each of said tracks, each of said button assemblies including a button member having a lip running around its periphery and an indentation formed in the central portion thereof, said lip being adapted to matingly engage said C-shaped members of the latching assemblies with each of said latching members fitted in a respective one of said indentations, thereby enabling a ninety degree rotation of said beam assembly on said button assemblies so that said beam assembly can be positioned along said third track.

3. The system of claim 2 wherein the lips and indentations of said button members are substantially circular.

4. The system of claim 2 wherein each of said button assemblies comprises a flat plate, said button member being attached to said plate, said plate being attached to one of the walls of said compartment.

* * * * *